(12) United States Patent  
Petersson et al.

(10) Patent No.: US 8,632,710 B2  
(45) Date of Patent: Jan. 21, 2014

(54) METHOD FOR THE MANUFACTURE OF A COMPOSITE ARTICLE

(75) Inventors: Mikael Petersson, Linköping (SE); Björn Weidmann, Borensberg (SE); Max Krogager, Linköping (SE); Ingemar Turesson, Linköping (SE)

(73) Assignee: SAAB AB, Linköping (SE)

( * ) Notice: Subject to any disclaimer, the term of this patent is extended or adjusted under 35 U.S.C. 154(b) by 1488 days.

(21) Appl. No.: 11/464,834

(22) Filed: Aug. 16, 2006

(65) Prior Publication Data

US 2007/0039689 A1 Feb. 22, 2007

(30) Foreign Application Priority Data

Aug. 17, 2005 (EP) .................................. 05107578

(51) Int. Cl.  
*B27N 3/10* (2006.01)  
*B29C 70/44* (2006.01)  
*B29C 65/00* (2006.01)  
*B32B 9/04* (2006.01)

(52) U.S. Cl.  
USPC ........... 264/258; 264/257; 264/512; 264/571; 156/285; 156/292; 156/307.1

(58) Field of Classification Search  
USPC ................. 264/313, 317, 258, 257, 512, 571; 156/285, 292, 307.1; 428/411.1  
See application file for complete search history.

(56) References Cited

U.S. PATENT DOCUMENTS

| | | | | |
|---|---|---|---|---|
| 3,995,081 A | * | 11/1976 | Fant et al. | 428/119 |
| 4,675,061 A | | 6/1987 | Mead | |
| 4,983,463 A | * | 1/1991 | Minford et al. | 428/435 |
| 5,079,055 A | | 1/1992 | Doyle et al. | |
| 5,350,611 A | | 9/1994 | Franklin, III et al. | |
| 5,496,002 A | * | 3/1996 | Schutze | 244/123.3 |
| 6,000,801 A | * | 12/1999 | Dillon et al. | 353/28 |
| 2002/0173575 A1 | * | 11/2002 | Artz et al. | 524/451 |
| 2003/0098520 A1 | * | 5/2003 | Cournoyer et al. | 264/156 |

FOREIGN PATENT DOCUMENTS

GB 2 039 820 A 8/1980

* cited by examiner

*Primary Examiner* — Atul P. Khare  
(74) *Attorney, Agent, or Firm* — Venable LLP; Eric J. Franklin

(57) ABSTRACT

The present invention relates to a method for the manufacture of a composite article comprising a composite plate (1) and at least one fitting (4). The method is characterized by the steps of arranging at least one former on said composite plate (1), arranging at least one fitting (4) on said composite plate (1), producing a lay-up by applying a composite material layer (9) least partly covering an external surface of the former and of the fitting, and curing the layup in a curing process. After curing, said composite material layer (9) forms the walls of a stiffener and at least partly encloses the fitting so as to support it in a predetermined position.

9 Claims, 4 Drawing Sheets

METHOD FOR THE MANUFACTURE OF A COMPOSITE ARTICLE

TECHNICAL FIELD

The present invention relates to a method for the manufacture of a composite article comprising at least one.

The present invention further relates to a composite article comprising at least one fitting and obtainable by the method above.

PRIOR ART

The fabrication of many items and structural elements, such as vehicles, vessels and aircraft, out of curable composite materials containing layers of fibers or metals joined by means of an adhesive layer of for example thermoplastic, is known. Such composite materials are distinguished by high strength and relatively low weight. These distinguishing properties have resulted in it becoming increasingly common in the aviation industry to use items containing composite materials.

Conventionally, structural elements of composite materials are manufactured by arranging a former made of metal on a base plate and laying up laminate layers on the former, so that the laminate lies against the surface of the former. Thereafter, the base plate with the laminate layer covered former is inserted into a pressurized tank, wherein the laminate element is cured. After curing, the cured element is removed from the former. It is known to encapsulate the base plate, former and laminate material in a bag before insertion into the pressurized tank in order to increase the pressure acting on the composite material in the pressurized tank. The use of the bagging-technique is widely spread and variants of the bagging-technique are described in a great number of patent documents, books and articles.

Structural elements such as doors, door cases, flaps, ailerons, wing boxes, wing tips, do often need to be supplied with fittings in the form of hinges, locking devices, locking cylinders, electrical devices, etc. These are mounted in the structural element after the structural element has been cured. The mounting of the fittings in the structural elements requires several operational steps such as drilling, milling and screwing. It is very time consuming and/or requires expensive machines to perform these operational steps with the tolerances required. Further, these operational steps tend to decrease the strength of the structural element and therefore calculations must be made regarding the strength of the structural element in the areas around the fittings and the structural element must be made thicker in accordance with the calculations. The requirement of a thicker structural element in the areas of the fittings implies that the structure of the element becomes more complex and has a higher weight due to the additional material. It is very important to provide as lightweight structural elements as possible especially when the elements are intended for use in automotive, aeronautic and space applications.

One object of the invention is to provide a way of mounting the fillings on structural elements essentially without using the operational steps above such as drilling, milling and screwing.

SUMMARY OF THE INVENTION

A method for the manufacture of a composite article comprising a composite plate and at least one fitting according to one embodiment of the invention comprises the following steps: arranging at least one former on said composite plate, arranging at least one fitting on said composite plate, producing a lay-up by applying a composite material layer at least partly covering an external surface of the former and of the fitting, and curing the lay-up in a curing process. After curing, said composite material layer forms the walls of a stiffener. Said composite material layer further at least partly encloses the fitting so as to support it in a predetermined position. In one preferred embodiment, the former is removed after curing.

The former is in accordance with one embodiment of the invention water soluble and comprises a fiber material and an adhesive and water. The fiber material is for example a fabric such as a woven textile, glass, carbon, aramide etc. For example, a dishcloth could serve as the fiber material. The adhesive is for example a starch such as starch from corn, potatoes or wheat or an adhesive of another type such as polyvinyl alcohol (PVA). For example, paperhangers paste can be used in manufacturing the former, said paperhangers paste comprising both starch and water. In using the water soluble former it is possible to manufacture composite articles with very complex geometries in only one cure operation. The former is then dissolved in water after the curing step.

The former can also constitute part of the final, cured composite product. The former is for example a fiber composite article in itself. The former comprises then in one example a fiber material and a thermosetting plastic, such as epoxy, vinyl ester or polyester. The fiber material comprises for example glass fibers, carbon fibers or aramide fibers.

It is important that the fittings are arranged at precise locations on the final composite article. Therefore, in accordance with one embodiment of the present invention, pins are arranged on predetermined locations on the plate, wherein the step of arranging the fittings on the plate includes mounting each fitting on a respective pin. In accordance with another embodiment of the invention, the step of arranging the fitting on the plate is assisted by laser projection.

The at least one fitting is preferably made of a material having the same coefficient of thermal expansion as the composite layer and composite plate. Then, as the coefficient of thermal expansion is not higher than the coefficient of thermal expansion of the composite plate and composite layer, tension in the material is minimized. Further, as the coefficient of thermal expansion is not smaller than the coefficient of thermal expansion of the composite plate and composite layer, the fitting is detachably or fixedly integrated in the composite article material in the curing step. It is also advantageous if the fitting material has such characteristics that it provides substantially no galvanic corrosion against the composite material. Titanium is an example of a material both having a low coefficient of thermal expansion and providing substantially no galvanic corrosion against the composite material. Therefore a fitting made of titanium or a titanium based alloy is preferably used in combination with a carbon fiber composite material in the composite plate and composite layer, said carbon fiber composite having a substantially equal coefficient of thermal expansion. On the other hand, if the composite plate and composite layer is made of a glass fiber composite, then the fitting(s) can for example be made of stainless steel or aluminum.

In accordance with another preferred embodiment of the invention at least one of the fittings is detachable from the cured composite article. The fitting is then for example cone shaped or of another shape without protrusions locking the fitting in the composite article. In this case, the fitting used in the manufacture may be a "fitting former" shaped as the fittings and replaced by the fittings after manufacture of the composite article. In yet another embodiment of the invention the fitting has a first part integrated in the composite article and shaped so as to be locked in the composite article and a second part protruding from the composite article, which second part is detachable from the first fitting part.

The fittings are for example hinges, handles locking devices or locking cylinders or electrical devices. The composite articles are for example doors, door cases, flaps, ailerons, wing boxes, wing tips etc. and can for example be used in automotive, marine, aeronautic or space applications.

The invention also relates to a composite article comprising at least one fitting and obtainable by the method according to the above, said composite article being characterized in that the at least one fitting is formed in the composite article material and at least partly enclosed by the composite article material layer supporting the fitting in its position.

In using the method according to the invention, composite articles can be manufactured having complex geometries, which today are regarded as impossible to obtain, and having perfect fitting surfaces or having fittings integrated in the composite articles. As the fittings can be integrated in the composite article at the same time as the composite article is manufactured, many economical advantages are obtained. For example, labor costs can be decreased as the time consuming step of mounting the fittings is practically eliminated and the areas of premises can be decreased as no areas for performing the mounting of fittings are necessary. Further, it is much easier to obtain the tolerance chain compared to when using conventional techniques. For the manufacture of composite articles in accordance with the invention, important tolerance determined dimensions for the final article can be determined, and the manufacture can then be performed such that these tolerances are kept.

SHORT DESCRIPTION OF THE DRAWING

The present invention will now be described by means of the attached drawing, wherein.

Figure 1:
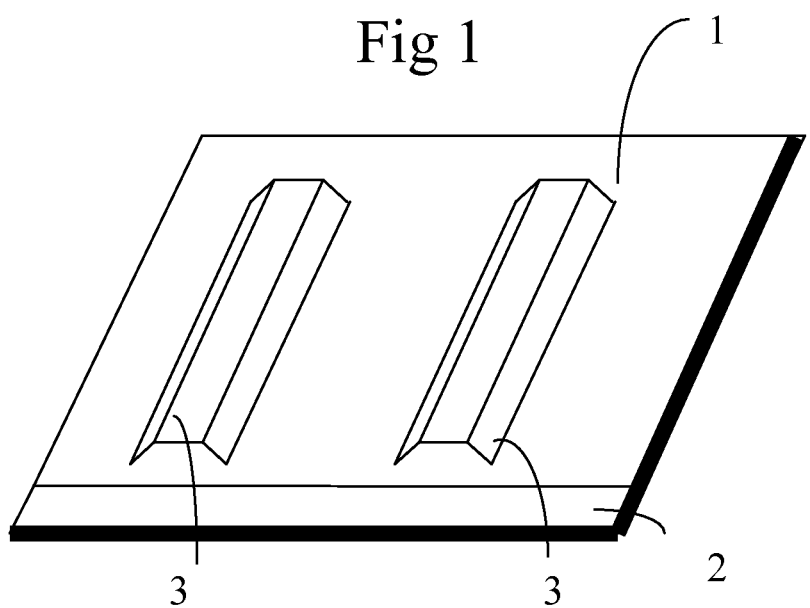
FIG. 1 shows a perspective view of an arrangement comprising two formers arranged on a composite plate.

It should be noted that the drawing is not drawn to scale and that the size of certain features have been exaggerated for the sake of clarity.

The following description and drawings are not intended to limit the invention to the embodiments disclosed. The embodiments disclosed merely exemplify the principles of the present invention.

Preferred Embodiments

In FIG. 1, a composite plate 1 is arranged on a base plate 2. The base plate 2 is a thick sheet, for example made of metal. In the shown figure, the base plate has larger dimensions than the composite plate 1. Two formers 3 are arranged on top of the composite plate 1. The formers 3 are for example made of a water-soluble stabilizing fiber composite.

Figure 2:
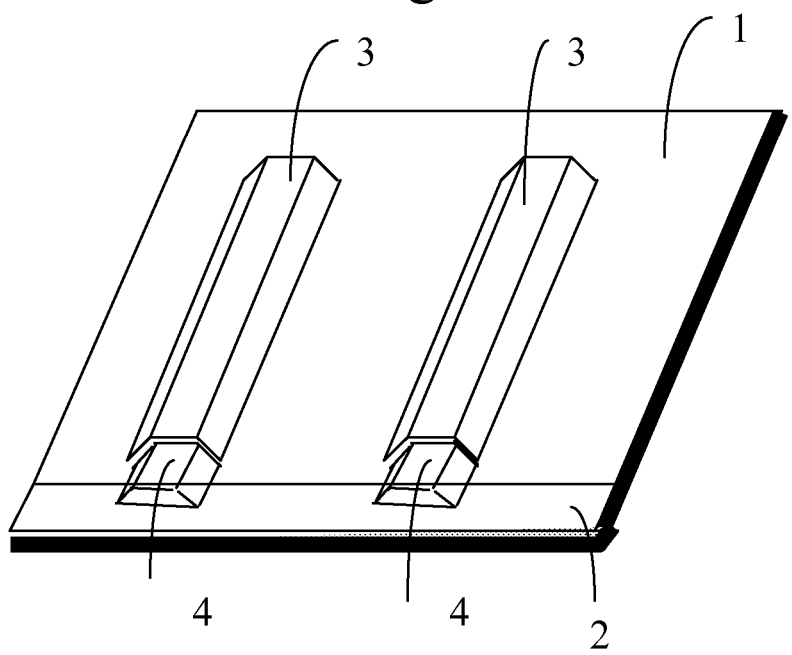
FIG. 2 shows the arrangement of FIG. 1 supplemented with a fitting positioned in the extension of each respective former.
Figure 8:
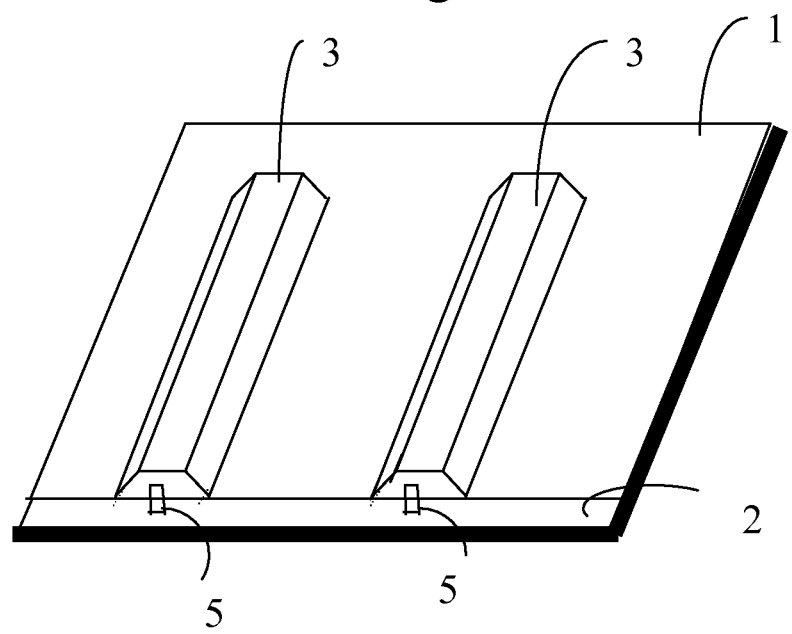
FIG. 8 shows the arrangement in FIG. 2 in accordance with an alternative embodiment, wherein the plate is provided with pins for accurate positioning of the fittings.
Figure 9:
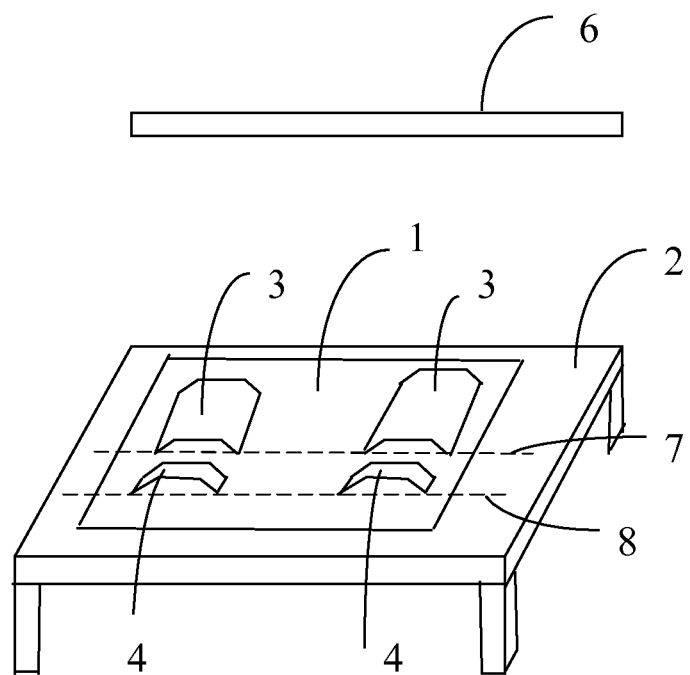
FIG. 9 shows the arrangement in FIG. 2 in yet another embodiment of the invention wherein the positioning of the formers and fittings is assisted by laser projection.

In FIG. 2, a fitting 4 is arranged in the extension of each former 3. The fittings are intended to be integrated in the final article such that it is either detachable or fixed after curing. In the alternative embodiment of FIG. 8, the base plate 2 is provided with pins 5 mounted in locations and formed so as to fix the fittings 4 (not shown in FIG. 2) in a predetermined position. In another alternative embodiment, as disclosed in FIG. 9, a laser arrangement 6 is mounted for example in the ceiling. The laser arrangement is arranged to emit a laser curtain in a predetermined number of directions. The directions are set such that laser lines 7, 8 are projected on the composite plate 1, which lines 7, 8 provide mounting positions for the formers 3 and fittings 4. The laser arrangement 6 is in one example arranged to emit several laser curtains at the same time and in another example arranged to emit the laser curtains in sequence.

Figure 3:
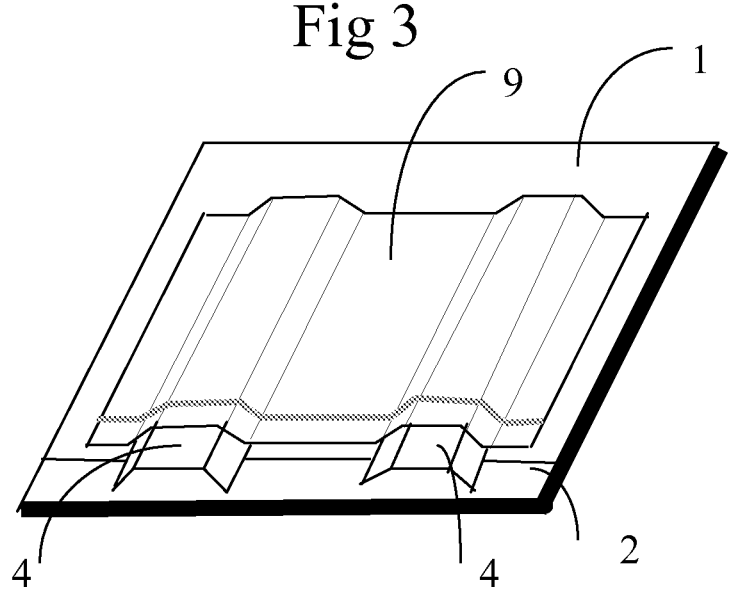
FIG. 3 shows a lay-up on the arrangement in FIG. 2 for the manufacture of an article.

In FIG. 3, a composite layer 9 is formed on the external surface of the formers and of the fittings. The term "external surface" relates to the outer surfaces of the formers and fittings not facing the composite plate 1. The composite layer 9 further extends down into contact with the composite plate 1 so that the composite layer 9 material can be integrated with the composite plate material in a following curing process. In the figure, the composite layer 9 only partly covers the fittings such that a part adjacent the associated former is covered by the composite layer.

Thus, the back sheet (not shown) of the composite plate 1 then forms an outer surface of the final article and the composite layer 9 forms a stiffener, spar etc. in which one or more fittings are formed. The formers 3 thus enable the manufacture of a composite panel (i.e. the composite plate 1) integrated with a stiffener or spar etc. having internal hollow parts, the composite plate and each respective composite layer covered former defining the walls of each respective hollow part. The stiffener is for example a so called hat stiffener or omega stiffener.

In one example, the composite layer 9 and composite plate 1 both are made of a carbon fiber composite material. In this example the base plate is for example made of invar (i.e. Alloys of iron and nickel having a very low coefficient of thermal length expansion) and the fittings are for example made of titanium. In another example, the composite layer 9 and composite plate 1 are for example made of a glass fiber composite material. In this example, the base plate 2 is for example made of steel and the fittings are for example made of stainless steel or aluminum. It is evident that the above mentioned materials only constitute not limiting examples. However, in general, the base plate 2, composite plate, composite layer 9 and fittings 4 should have substantially equal coefficient of thermal expansion. Thereby the fitting is integrated in the composite article material in the curing step. It is also in some applications advantageous if the fitting material has such characteristics that it provides substantially no galvanic corrosion against the composite material. Titanium is an example of a material providing substantially no galvanic corrosion against the carbon fiber composite material.

Figure 4:
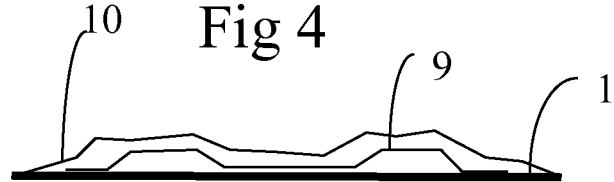
FIG. 4 shows in cross-section the lay-up of FIG. 3, enclosed in a bagging film.

In FIG. 4, an outer vacuum bagging film 10 is enclosing the outer surface of the composite layer 9 and the composite plate 1. In the shown example, the film 10 is fastened along the periphery of the base plate 2, using some fastening means, such as, e.g. adhesive tape and bagging sealants. An inner bagging film (not shown) can be placed in the space between the formers/fittings and composite plate. The circumference of the inner bagging film is then chosen such that the inner bagging film can seal tight against the walls defined by the inner surfaces of the formers/fittings and the composite plate 1. In the case of both outer and inner bagging films, the edges of the vacuum bagging films are preferably connected to each other and sealed. This is called free standing bagging.

When a pump (not shown) is started, the gas that is present between the bagging films will be carried away through at least one outlet in the bagging films. Thereby a vacuum will be created, whereupon the bagging films will seal tight upon the article. It should be noted that additional elements can be arranged between the article and the bagging films; for example, a perforated plastic film (not shown) can be placed nearest the article, and a so-called tear-away cloth (not shown) can be placed between the article and the bagging films.

In one embodiment, the base plate 2 with its associated article parts 1, 9, 4 and the formers 3 can be put into a pressure tank, whereby curing is performed under an increased pressure compared to normal air pressure, for example 1 to 6 bar overpressure. In a further embodiment, the curing is performed in a so-called autoclave wherein the curing is performed in heat, for example in the temperature region of 100°-200° C., and under an increased pressure, such as 1-6 bar overpressure. In yet another embodiment the curing is performed in an oven for example in the temperature region of 100°-200° C.

In using this bagging technique, wherein a unitary pressure is provided on the formers both from beneath and from above, the former 3 will withstand high curing pressures even if made of a water-soluble stabilizing laminate, and therefore perform as well as a conventional metal former in that aspect.

Figure 5:
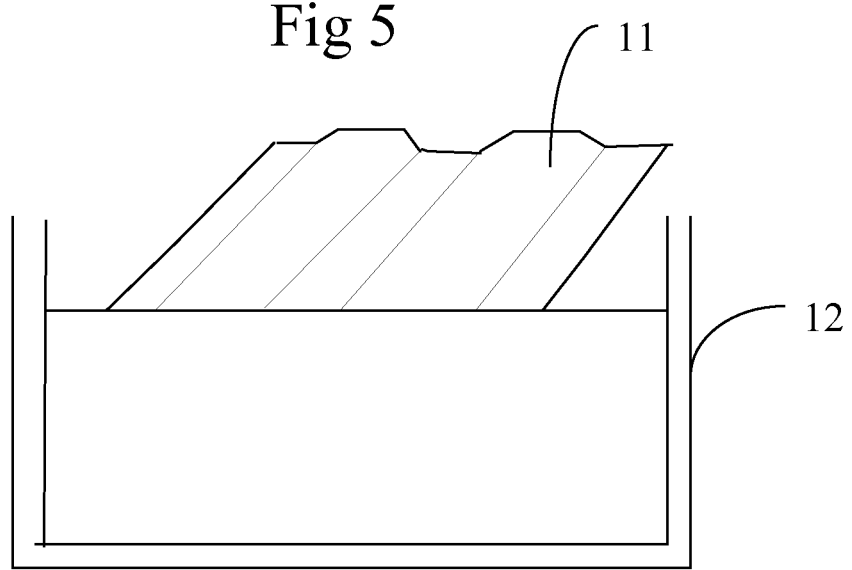
FIG. 5 shows schematically a water tank into which the lay-up is submerged after removal of the bagging film.

In FIG. 5, the cured article 11 including the water-soluble formers is debagged and submerged in a water tank 12. The water dissolves the starch, whereby the stabilizing laminate softens and thus becomes easy to remove. Alternatively, running water can be applied to the formers in order to dissolve the starch.

In FIGS. 1-5, and FIGS. 8-9, an example has been described wherein the former material is water-soluble. The former is then for example made of a fabric wetted by a mixture of water and starch. The former is then manufactured by placing the wetted fabric on a master tool (not shown) such that the former lies against the surface of the master tool. As the fabric is wetted, it can easily be formed around the surface of the master tool. The wetted fabric can advantageously dry over night in room temperature. When the former has dried, it is stiff and can be removed from the master tool. The master tool can be shaped in order to make formers of a great number of different shapes. For example, profiles can be made, such as hat profiles, omega profiles etc.

The former can also be made of another material, such as a metal or a non-water-soluble fiber composite material. In one example the former is formed such that it can be released after curing. In another example the former constitutes part of the final article.

Figure 6:
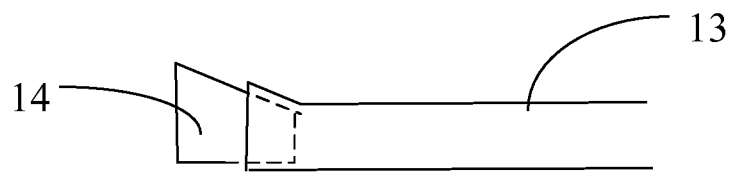
FIG. 6 shows a side view of an article according to a first embodiment of the invention provided with a detachable fitting.

FIG. 6 shows a profile 13 in which a detachable fitting 14 is formed. In the picture, the fitting 14 is formed as a wedge. However, in order to provide a profile 13 after curing having a detachable fitting, the fitting can be designed in many other ways. For example, the part of the fitting 14 extending into the profile can be a straight cylinder, a rectangular profile or the like, or shaped as a cone (circular or elliptical, straight or oblique, cut in its narrow end or not), or a rod which is cylinder shaped or having another profile and which has a sloping surface. With the detachable fitting 14, a former designed as the fitting can be used in manufacture of the article, whereupon the detachable fitting former is removed and the fitting can be inserted in the article.

Figure 7:
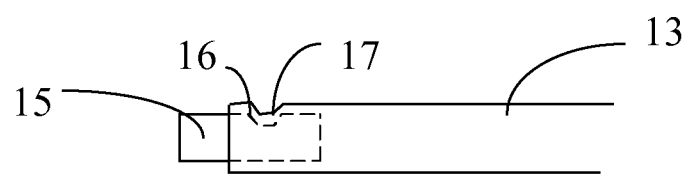
FIG. 7 shows a side view of an article according to a second embodiment of the invention provided with a fitting fixed in the article.

FIG. 7 shows an embodiment, wherein a fitting 15 is fixed in the profile 13. A recess 16 in the fitting and a corresponding recess 17 in the profile 13 secure the fixed attachment of the fitting 15 in the profile 13. However, in order to provide a profile after curing having a fixed fitting, the fitting can be designed in many other ways. The only requirement is that in some position along its length, the part of the fitting introduced in the profile has a protrusion or is directed such that it locks the fitting in the profile. For example, the wedge-shaped fitting of FIG. 6 introduced in the profile with its thick end first provides locking of the fitting in the profile.

In a not shown example, the fitting is made of two or more parts, wherein the first part is fixed in the article and the second part is detachable from the first part and thereby can be exchanged when/if damaged.

The fitting is for example a hinge, handle, locking device, a locking cylinder or an electric device. The article is for example intended for use in automotive, aeronautic or space industry. The article can for example be a door case, a door, a flap, an aileron, a wing box or a wing tip.

The invention claimed is:

1. A method for manufacturing a composite article comprising the steps of:
    positioning at least one former on a composite plate;
    positioning a detachable fitting former on said composite plate at an edge of each positioned former;
    laying up a composite material layer to at least partially cover and contact an external shaping surface of each former and each detachable fitting former so that each detachable fitting former protrudes outside of the resulting layup and so that the layup extends into contact with the composite plate;
    curing the layup so that the composite material layer integrates with said composite plate, thereby forming on said composite plate at least one stiffener, each stiffener having walls at least partially enclosing each detachable fitting former to provide support thereto in a predetermined position;
    removing each former after said curing; and
    replacing each detachable fitting former after said curing with a fitting having the same detachable fitting former shape so that each fitting is supported by each stiffener in a predetermined position.

2. The method according to claim 1, further comprising:
    manufacturing each former from a water-soluble fiber composite material; and
    conducting said removing of each former by dissolving each former in water.

3. The method according to claim 1, further comprising arranging a distinct pin for each detachable fitting former at a predetermined location on the composite plate, wherein the positioning of each detachable fitting former comprises mounting each detachable fitting former onto its respective pin.

4. The method according to claim 1, wherein the positioning of each detachable fitting former is assisted by laser projection.

5. The method according to claim 1, wherein a substantially unitary pressure is provided on all surfaces of the layup during said curing.

6. The method according to claim 5, wherein the substantially unitary pressure is provided by enclosing outer surfaces of the layup in at least one bag and applying a vacuum between the layup and the at least one bag.

7. The method according to claim 1, wherein an increased pressure is applied to the outside of the layup and the at least one bag during said curing.

8. The method according to claim 1, wherein the composite article is used in an automotive, marine, aeronautic, or space application.

9. The method according to claim 1, wherein the composite article is used as a door, door case, flap, aileron, wing box, or wing tip.

* * * * *